US008651227B2

(12) United States Patent
Taniguchi et al.

(10) Patent No.: US 8,651,227 B2
(45) Date of Patent: Feb. 18, 2014

(54) MOTOR CONTROL DEVICE AND ELECTRIC POWER STEERING DEVICE

(75) Inventors: Yoji Taniguchi, Okazaki (JP); Takumi Ito, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 194 days.

(21) Appl. No.: 13/146,796

(22) PCT Filed: Jan. 28, 2010

(86) PCT No.: PCT/JP2010/000486
§ 371 (c)(1),
(2), (4) Date: Aug. 10, 2011

(87) PCT Pub. No.: WO2010/092759
PCT Pub. Date: Aug. 19, 2010

(65) Prior Publication Data
US 2011/0297475 A1    Dec. 8, 2011

(30) Foreign Application Priority Data

Feb. 10, 2009 (JP) ................................. 2009-028889

(51) Int. Cl.
*B62D 5/04*          (2006.01)
(52) U.S. Cl.
USPC ........................... 180/446; 318/434; 318/490
(58) Field of Classification Search
USPC .......... 180/443, 444, 446; 318/434, 490, 491, 318/530; 701/41–43
See application file for complete search history.

(56) References Cited

U.S. PATENT DOCUMENTS

| 5,758,741 | A | 6/1998 | Tomioka |
| 2006/0069481 | A1* | 3/2006 | Kubota et al. ................... 701/41 |
| 2008/0069547 | A1 | 3/2008 | Jiang |
| 2008/0290829 | A1* | 11/2008 | Suzuki .......................... 318/563 |

(Continued)

FOREIGN PATENT DOCUMENTS

| CN | A-101213126 | 7/2008 |
| EP | 1 777 806 A2 | 4/2007 |

(Continued)

OTHER PUBLICATIONS

European Search Report issued in Application No. 10741039.1; Dated Nov. 2, 2011.

(Continued)

*Primary Examiner* — Anne Marie M. Boehler
(74) *Attorney, Agent, or Firm* — Oliff PLC

(57) ABSTRACT

A motor control device and an electric power steering system that make it possible to suppress occurrence of voltage saturation with a simple configuration are provided. A current limiting value computing unit computes a current limiting basic value of which the value is lower as a rotation angular velocity of a motor increases, and computes a voltage gain of which the value is smaller as a power voltage value, detected by a first voltage sensor provided at an electric power line that constitutes an electric power supply line to the motor, decreases. In addition, the current limiting value computing unit computes a difference between a control voltage value, detected by a second voltage sensor provided at a control line independent of the electric power line, and the above power voltage value, and computes an output gain of which the value is smaller as the difference increases. Then, by multiplying the output gain by the current limiting basic value together with a voltage gain, a current limiting value is computed.

6 Claims, 4 Drawing Sheets

(56) References Cited

U.S. PATENT DOCUMENTS

| | | |
|---|---|---|
| 2010/0044146 A1* | 2/2010 | Kasai et al. .................. 180/446 |
| 2011/0094821 A1* | 4/2011 | Aoki ............................. 180/446 |
| 2011/0214934 A1* | 9/2011 | Ueda et al. ................... 180/446 |

FOREIGN PATENT DOCUMENTS

| | | |
|---|---|---|
| EP | 1 903 671 A2 | 3/2008 |
| GB | 2 177 358 A | 1/1987 |
| JP | A-04-281387 | 10/1992 |
| JP | A-08-127355 | 5/1996 |
| JP | B2-3408642 | 5/2003 |
| JP | A-2008-079387 | 4/2008 |

OTHER PUBLICATIONS

International Search Report issued in Application No. PCT/JP2010/000486; Dated Apr. 27, 2010 (With Translation).

Jul. 31, 2013 First Notice of Opinion on Examination issued in Chinese Patent Application No. 201080005889.2 (with English Translation).

* cited by examiner

MOTOR CONTROL DEVICE AND ELECTRIC POWER STEERING DEVICE

TECHNICAL FIELD

The invention relates to a motor control device and an electric power steering system.

BACKGROUND ART

In an electric power steering system (EPS) that uses a motor as a driving source, obviating occurrence of a state where application of an excessive motor voltage that exceeds a high limit of voltage that can be output is required, that is, a voltage saturation state is one of issues that should be resolved in order to stably generate assist force to achieve favorable steering feeling.

The rotation angular velocity of the motor (motor speed) is proportional to a voltage applied to the motor. As the motor speed increases, a larger voltage command value is computed. However, in an EPS that uses an in-vehicle battery as a main power supply, the voltage that can be output from a driving circuit thereof has a high limit. Therefore, at the time of steering at a high speed, at the time when impact force acts on steered wheels, or the like, a voltage saturation state may occur with an increase in the motor speed. When a torque ripple occurs due to voltage saturation and then the torque ripple propagates to a vehicle cabin in form of sound or vibrations, there is a possibility that a steering feeling deteriorates.

Conventionally, as measures against the above described steering feeling deterioration, there has been disclosed a method of limiting a current command value computed as a target value for power assist control. For example, see Patent Document 1.

Usually, in the EPS, torque generated by the EPS is controlled through current control. A control device for the EPS first computes a current command value (q-axis current command value) as a target value of motor torque that should be generated in order to apply assist force, and secondly, in order to cause an actual current value (q-axis current value) to follow the current command value, computes a voltage command value corresponding to the deviation therebetween. Thirdly, in order to apply a voltage indicated by the voltage command value to the motor, motor control signals for operating a driving circuit are generated.

By decreasing a current limiting threshold with an increase in the motor speed, it is possible to suppress an increase in the deviation between a current command value and an actual current value, which occurs in a motor high-speed rotation range, and an increase in voltage command value accordingly. In this way, an attempt to suppress voltage saturation is made.

However, there is also an occurrence factor of voltage saturation, other than an increase in the motor speed. The output voltage of the motor driving circuit, which is utilized as a voltage applied to the motor, varies depending on variations in power supply voltage. As the power supply voltage decreases, the output voltage of the motor driving circuit decreases and then the voltage applied to the motor decreases. Thus, as the power supply voltage decreases by a large amount, a voltage saturation state more easily occurs. In addition, even at the time when the motor output is increased, voltage saturation easily occurs due to a voltage drop resulting from conduction of a large current.

Note that most of motor control devices that supply driving electric power to a motor on the basis of a voltage stepped up by a step-up circuit are configured to, when the power supply voltage is decreased, suppress the step-up control to attempt to reduce a load on the step-up circuit. For example, see Patent Document 2. Therefore, when the power supply voltage is decreased, the voltage that can be output significantly decreases. As a result, the motor control device provided with a step-up circuit has a feature that voltage saturation further easily occurs as compared with a control device with no step-up circuit.

RELATED ART DOCUMENT

Patent Document

Patent Document 1: Japanese Patent Application Publication No. 2008-79387
Patent Document 2: Specification of Japanese Patent No. 3408642

DISCLOSURE OF THE INVENTION

Problems to be Solved by the Invention

As described above, in order to suppress voltage saturation by limiting a current command value, it is desirable to compute an appropriate limiting value where necessary, in consideration also of a factor other than a motor speed. However, an increase in computation load required for the computing process requires a higher-performance information processing unit (microcomputer) that constitutes a control device. This becomes a cause of an increase in manufacturing cost. Therefore, a technique for effectively suppressing occurrence of voltage saturation with a further simple configuration has been expected.

The invention is made in order to solve the above problems, and one of the objects of the invention is to provide a motor control device and an electric power steering system that make it possible to effectively suppress occurrence of voltage saturation with a further simple configuration.

Means for Solving the Problems

According to a first aspect of the invention, in a motor control device that includes: a control circuit including signal output means for outputting a motor control signal by executing current control; and a driving circuit that is operated upon reception of the motor control signal to supply driving electric power to a motor, wherein the signal output means limits a current command value computed in the current control to a value at or below a predetermined limiting value, and reduces the limiting value in accordance with an increase in motor speed, there are provided first voltage detecting means for detecting a first power supply voltage supplied through an electric power line in order to apply voltage to the driving circuit and second voltage detecting means for detecting a second power supply voltage supplied to the control circuit through a control line independent of the electric power line, and the signal outputting means reduces the limiting value in accordance with a decrease in the first power supply voltage, and computes a difference between the second power supply voltage and the first power supply voltage and then reduces the limiting value by a larger amount as the difference increases.

That is, at the time when a motor output is increased, a voltage drop occurs in the electric power line, whereas such a voltage drop does not occur in the control line independent of the electric power line. That is, by comparing the first power supply voltage and the second power supply voltage that are supplied through respective lines, it is possible to easily estimate the output state of the motor without leading to an increase in computation load. Thus, with the above configuration, it is possible to determine the current limiting value in consideration of not only an increase in motor speed but also a decrease in power supply voltage and variations in motor output with a simple configuration. As a result, it is possible to further effectively suppress occurrence of voltage saturation.

In the above aspect of the invention, a step-up circuit that steps up and outputs the first power supply voltage may be provided at the electric power line, and the driving circuit may generate the driving electric power based on the stepped-up voltage, and, at the time when the first power supply voltage is decreased, may suppress voltage step up made by the step-up circuit.

That is, at the time when the power supply voltage is decreased, a voltage applied to the driving circuit decreases by suppressing the step-up control, so voltage saturation further easily occurs. Thus, by applying the first aspect of the invention to the one that employs such a configuration, it is possible to obtain a further remarkably advantageous effect.

As a second aspect of the invention, the motor control device according to the above aspect may be used for an electric power steering system. With the above configuration, it is possible to effectively suppress voltage saturation and occurrence of a torque ripple due to the voltage saturation with a simple configuration. As a result, it is possible to provide an electric power steering system with higher quietness.

Effects of the Invention

According to the first and second aspects of the invention, it is possible to provide a motor control device and an electric power steering system that make it possible to effectively suppress occurrence of voltage saturation with a simple configuration.

MODES FOR CARRYING OUT THE INVENTION

Figure 1:
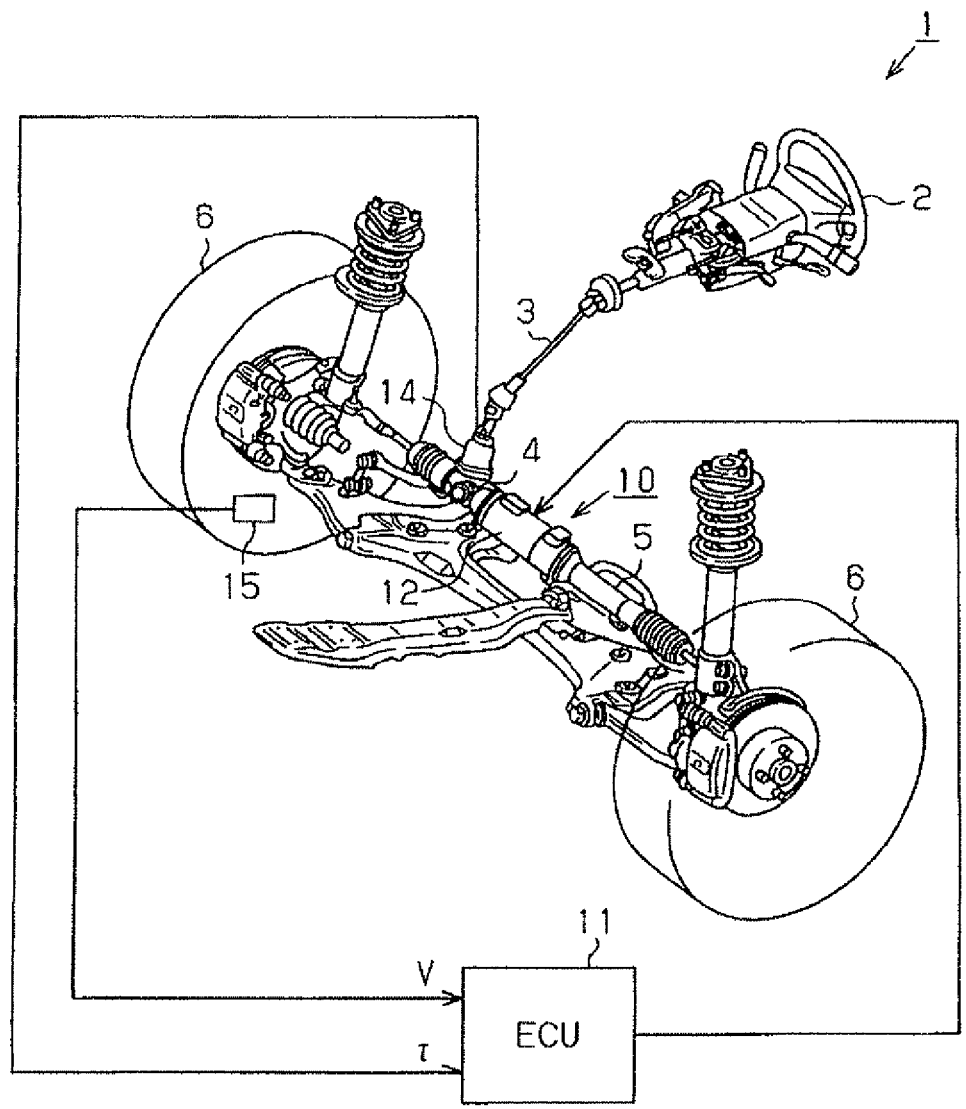
FIG. 1 is a schematic configuration diagram of an electric power steering system (EPS).

Hereinafter, an electric power steering system (EPS) that is one embodiment of the invention will be described with reference to the drawings. In the EPS 1 according to the present embodiment shown in FIG. 1, a steering shaft 3 to which a steering wheel (steering) 2 is fixed is coupled to a rack 5 via a rack-and-pinion mechanism 4, and rotation of the steering shaft 3 resulting from steering operation is converted to reciprocating linear motion of the rack 5 by the rack-and-pinion mechanism 4. Then, the steering angle of steered wheels 6 is changed by the reciprocating linear motion of the rack 5.

The EPS 1 includes an EPS actuator 10 and an ECU 11. The EPS actuator 10 serves as a steering force assisting device and applies assist force for assisting steering operation to a steering system. The ECU 11 serves as control means for controlling operation of the EPS actuator 10.

The EPS actuator 10 according to the present embodiment is a so-called rack-type EPS actuator in which a motor 12 that serves as a driving source is arranged coaxially with the rack 5, and assist torque generated by the motor 12 is transmitted to the rack 5 via a ball screw mechanism (not shown). Note that the motor 12 according to the present embodiment is a brushless motor, and rotates on three-phase (U, V and W) driving electric power supplied from the ECU 11. Then, the ECU 11 that serves as a motor control device controls assist torque generated by the motor 12 to thereby control assist force applied to the steering system.

In the present embodiment, a torque sensor 14 and a vehicle speed sensor 15 are connected to the ECU 11. The ECU 11 controls the EPS actuator 10 on the basis of a steering torque and a vehicle speed V respectively detected by the torque sensor 14 and vehicle speed sensor 15 to thereby control assist force applied to the steering system.

Figure 2:
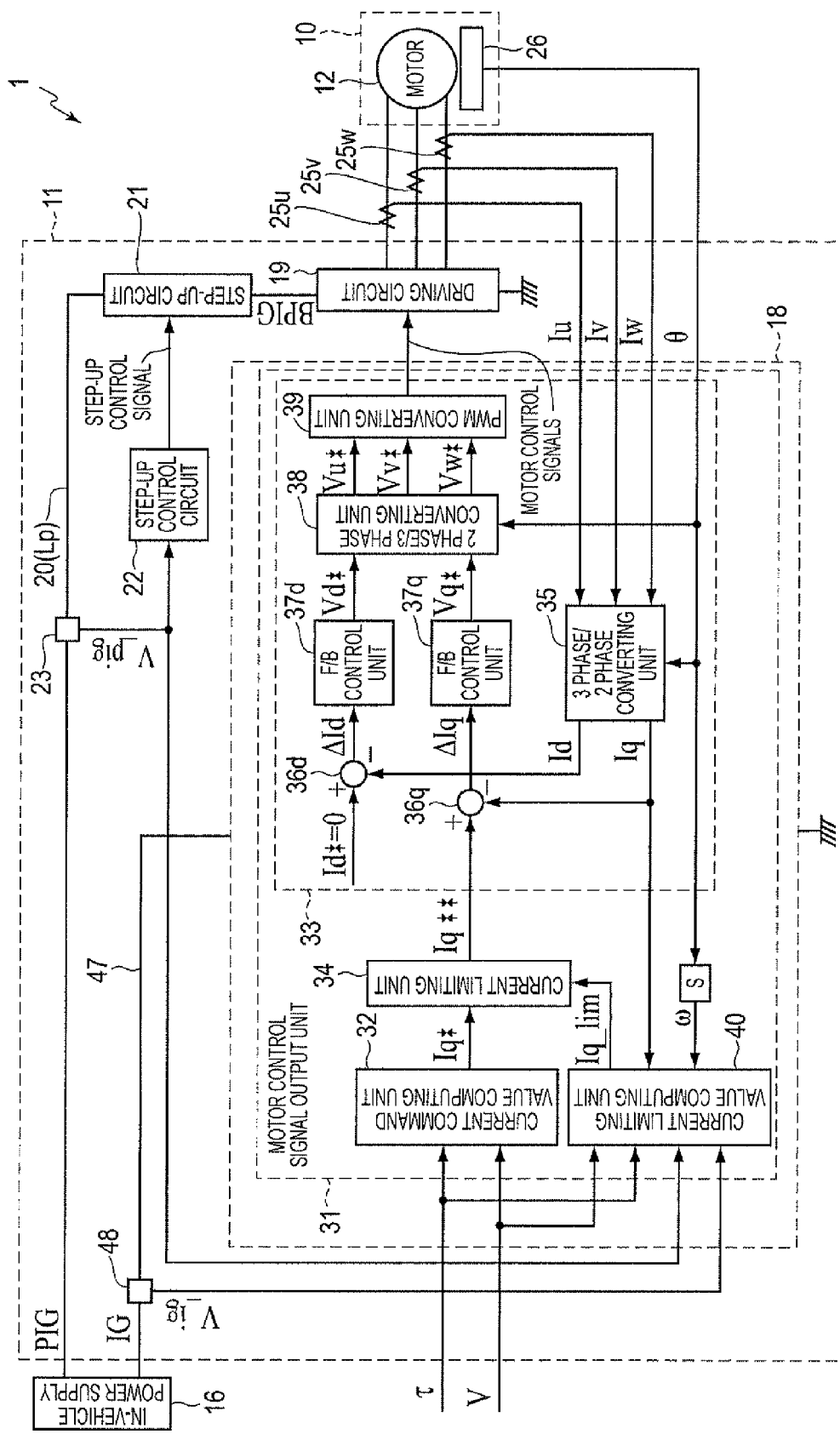
FIG. 2 is a block diagram that shows the electrical configuration of the EPS.

Next, the electrical configuration of the EPS according to the present embodiment will be described. FIG. 2 is a control block diagram of the EPS according to the present embodiment. As shown in the drawing, the ECU 11 includes a microcomputer 18 and a driving circuit 19. The microcomputer 18 serves as a control circuit that outputs motor control signals. The driving circuit 19 is operated upon reception of the motor control signals and supplies driving electric power to the motor 12 that is the driving source of the EPS actuator 10.

The driving circuit 19 includes a known PWM inverter that is formed by using a pair of serially connected switching elements as a base unit (arm), and connecting three arms corresponding to the respective phases in parallel with one another. The driving circuit 19 is provided in some midpoint of an electric power supply line Lp between the motor 12 and an in-vehicle power supply (battery) 16, which is a direct-current power supply. Thus, the driving circuit 19 is configured to supply the motor 12 with three-phase (U, V and W) driving electric power based on the applied voltage.

A voltage based on a power voltage (PIG) that serves as a first power supply voltage supplied through an electric power line 20 that connects the driving circuit 19 to the in-vehicle power supply 16 is applied to each arm that constitutes the driving circuit 19. Note that a step-up circuit 21 is provided in some midpoint of the electric power line 20, and a voltage (BPIG) stepped up by the step-up circuit 21 is applied to the driving circuit 19. In addition, the motor control signals output from the microcomputer 18 are input into the gate terminals of the respective switching elements as signals (gate ON/OFF signals) that define the ON duty ratios of the respective switching elements that constitute the driving circuit 19. Then, the driving circuit 19 is configured to convert the voltage (BPIG), output from the step-up circuit and applied to the arms, to three-phase (U, V and W) driving electric power and then output the three-phase (U, V and W) driving electric power to the motor 12 by turning on or off each of the switching elements in response to the motor control signal.

The operation of the step-up circuit 21 is controlled by a step-up control circuit 22 provided in the ECU 11. A power voltage value V_pig that is detected by a first voltage sensor 23 serving as first voltage detecting means provided at the electric power line 20 is input into the step-up control circuit 22. Then, at the time when the power voltage value V_pig is decreased, the step-up control circuit 22 suppresses voltage step up made by the step-up circuit 21, more specifically, the step-up control circuit 22 executes control to decrease the output voltage (BPIG) as the detected power voltage value V_pig decreases.

Current sensors 25u, 25v and 25w for detecting current values Iu, Iv and Iw of the respective phases conducted to the motor 12 and a rotation angle sensor 26 for detecting the rotation angle θ of the motor 12 are connected to the ECU 11. Then, the microcomputer 18 outputs motor control signals to the driving circuit 19 on the basis of the current values Iu, Iv and Iw of the respective phases and rotation angle θ of the motor 12, detected on the basis of the signals output from these sensors, and the above described steering torque τ and vehicle speed V.

In the microcomputer 18, a motor control signal output unit 31 that constitutes signal output means includes a current command value computing unit 32 and a motor control signal generating unit 33. The current command value computing unit 32 computes assist force applied to the steering system, that is, a current command value that serves as a control target value of motor torque. The motor control signal generating unit 33 generates motor control signals on the basis of the motor current command value calculated by the current command value computing unit 32.

The current command value computing unit 32 computes a q-axis current command value Iq* on the basis of the steering torque τ and vehicle speed V detected by the torque sensor 14 and the vehicle speed sensor 15.

The q-axis current command value Iq* output from the current command value computing unit 32 is input into a current limiting unit 34, and a current is limited so that the absolute value becomes equal to or lower than a predetermined threshold. Then, a q-axis current command value Iq** that has been subjected to the limiting process is input into the motor control signal generating unit 33.

In addition, together with the q-axis current command value Iq**, the current values Iu, Iv and Iw of the respective phases detected by the respective current sensors 25u, 25v and 25w and the rotation angle θ detected by the rotation angle sensor 26 are input into the motor control signal generating unit 33. Note that "0" is used for a d-axis current command value Id* (Id*=0). Then, the motor control signal generating unit 33 executes current feedback control on the d/q coordinate system on the basis of these current values Iu, Iv and Iw of the respective phases and the rotation angle θ (electrical angle) to thereby generate motor control signals.

In the motor control signal generating unit 33, the current values Iu, Iv and Iw of the respective phases are input into a three phase/two phase converting unit 35 together with the rotation angle θ, and are converted to a d-axis current value Id and a q-axis current value Iq on the d/q coordinate system by the three phase/two phase converting unit 35. Then, these d-axis current value Id and q-axis current value Iq are respectively input into corresponding subtracters 36d and 36q together with the d-axis current command value Id* and the q-axis current command value Iq**.

A d-axis current deviation ΔId and a q-axis current deviation ΔIq computed by the subtracters 36d and 36q are respectively input into corresponding feedback control units 37d and 37q. Then, in these feedback control units 37d and 37q, there is executed feedback control for causing the d-axis current value Id and the q-axis current value Iq, which are actual currents, to follow the d-axis current command value Id* and the q-axis current command value Iq** that are output from the current command value computing unit 32.

Specifically, the feedback control units 37d and 37q multiply the input d-axis current deviation ΔId and the input q-axis current deviation ΔIq by a predetermined feedback gain (PI gain) to compute a d-axis voltage command value Vd* and a q-axis voltage command value Vq*. Then, these d-axis voltage command value Vd* and q-axis voltage command value Vq* computed respectively by the feedback control units 37d and 37q are input into a two phase/three phase converting unit 38 together with the rotation angle θ, and are converted to three-phase voltage command values Vu*, Vv* and Vw* in the two phase/three phase converting unit 38.

The voltage command values Vu*, Vv* and Vw* computed by the two phase/three phase converting unit 38 are input into a PWM converting unit 39, and motor control signals corresponding to the respective voltage command values Vu*, Vv* and Vw* are generated by the PWM converting unit 39. Then, the microcomputer 18 is configured to output the motor control signals to the gate terminals of the respective switching elements that constitute the driving circuit 19 to thereby control operation of the driving circuit 19, that is, supply of driving electric power to the motor 12.

(Voltage Saturation Suppressing Control)

Next, a mode of voltage saturation suppressing control in the present embodiment will be described.

As described above, in the EPS, there is a possibility that a torque ripple generated due to voltage saturation propagates to a vehicle cabin in form of sound or vibrations to lead to deterioration of a steering feeling.

In consideration of this point, the microcomputer 18 (motor control signal output unit 31) executes current limiting process on the absolute value of the q-axis current command value Iq* computed as a target value of the current feedback control in order to avoid occurrence of such voltage saturation.

As shown in FIG. 2, the motor control signal output unit 31 includes a current limiting value computing unit 40, and the current limiting value computing unit 40 computes a current limiting value Iq_lim corresponding to the high limit of the q-axis current command value Iq*, at or below which it is possible to avoid occurrence of the voltage saturation. Then, the current limiting unit 34 is configured to execute current limiting process based on the current limiting value Iq_lim computed by the current limiting value computing unit 40 to thereby suppress occurrence of the voltage saturation.

More specifically, a rotation angular velocity ω of the motor 12 and the power voltage value V_pig detected by the first voltage sensor 23 are input into the current limiting value computing unit 40. Note that a value obtained by differentiating the rotation angle θ detected by the rotation angle sensor 26 is used as the rotation angular velocity ω that serves as the motor speed. The current limiting value computing unit 40 executes computation of the current limiting value Iq_lim on the basis of these rotation angular velocity ω and power voltage value V_pig.

Figure 3:
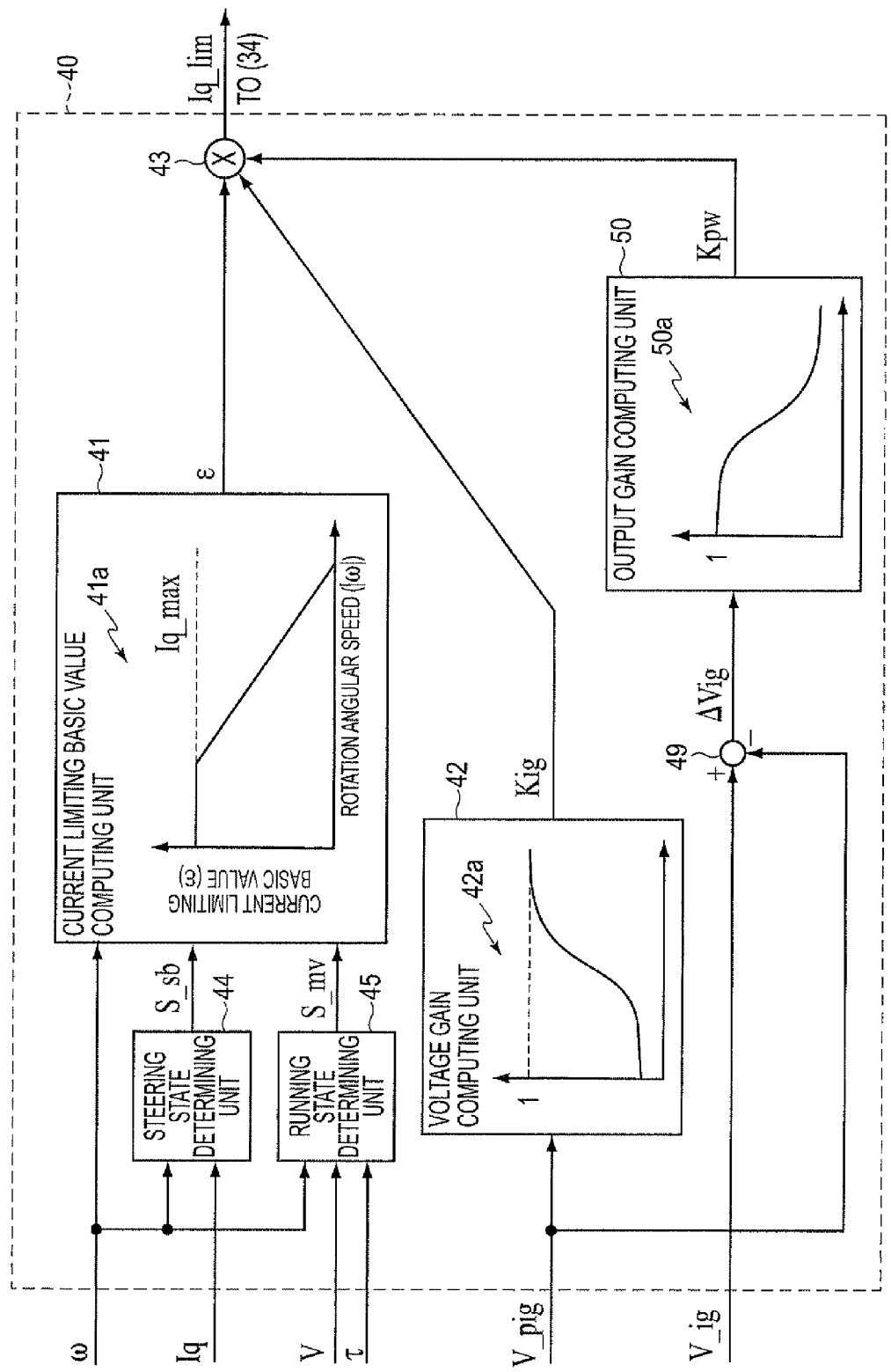
FIG. 3 is a block diagram that shows the schematic configuration of a current limiting value computing unit.

As shown in FIG. 3, the current limiting value computing unit 40 according to the present embodiment includes a current limiting basic value computing unit 41 that computes a current limiting basic value ϵ on the basis of a rotation angular velocity ω, and the current limiting basic value computing unit 41 computes the current limiting basic value ϵ such that the current limiting basic value ϵ has a lower value as the absolute value of the detected rotation angular velocity ω becomes higher.

In addition, the current limiting value computing unit 40 includes a voltage gain computing unit 42 that computes a voltage gain Kig on the basis of a power voltage value V_pig, and the voltage gain computing unit 42 computes a voltage gain Kig such that the voltage gain Kig has a smaller value as the detected power voltage value V_pig becomes lower (Kig≤1.0).

Note that the current limiting basic value computing unit 41 computes the current limiting basic value ϵ on the basis of a map 41a in which the absolute value of a rotation angular velocity ω is associated with a current limiting basic value ε (current limiting basic value map computation). In addition, the voltage gain computing unit 42 also computes the voltage gain Kig by referring to a map 42a in which a power voltage value V_pig is associated with a voltage gain Kig.

These current limiting basic value ε computed by the current limiting basic value computing unit 41 and voltage gain Kig computed by the voltage gain computing unit 42 are input into a multiplier 43. Then, the current limiting value computing unit 40 computes a current limiting value Iq_lim for executing current limiting process on the above described q-axis current command value Iq* on the basis of a value that is obtained by multiplying the current limiting basic value ε by the voltage gain Kig.

Voltage saturation more easily occurs as the rotation angular velocity ω of the motor 12 increases or as the power voltage value V_pig that serves as the first power supply voltage supplied through the electric power line 20 that constitutes the electric power supply line Lp between the driving circuit 19 and the in-vehicle power supply 16 decreases. Thus, as described above, when the current limiting basic values of which the value reduces as the rotation angular velocity ω increases is used as a base for computing the current limiting value Iq_lim, it is possible to reduce the current limiting value Iq_lim with an increase in motor speed. In addition, as described above, when the voltage gain Kig of which the value reduces as the power voltage value V_pig decreases is computed and is multiplied by the current limiting basic value ε, it is possible not only to reduce the current limiting value Iq_lim in accordance with an increase in the motor speed but also to further reduce the current limiting value Iq_lim with a decrease in the power voltage value V_pig. Thus, a configuration is achieved in which occurrence of voltage saturation is effectively suppressed even during an increase in the motor speed and during a decrease in power supply voltage.

Here, the current limiting value computing unit 40 includes a steering state determining unit 44 and a running state determining unit 45. The steering state determining unit 44 determines the state of steering operation made by a driver. The running state determining unit 45 determines the running state of a vehicle.

The steering state determining unit 44 determines on the basis of the rotation angular velocity ω of the motor 12, which serves as a state quantity that indicates a steering speed, and the q-axis current command value Iq* whether the steering state is steering in such a direction that the steering angle is reduced, that is, "return to center steering", and then outputs the determined results as a steering state signal S_sb to the current limiting basic value computing unit 41. In addition, the running state determining unit 45 determines on the basis of the rotation angular velocity ω of the motor 12, the steering torque ti and the vehicle speed V whether the running state of the vehicle is stopped or running at a low speed or not, and outputs the results as a running state signal S_mv to the current limiting basic value computing unit 41. Then, when the running state indicated by the running state signal S_mv is stopped or running and the steering state indicated by the steering state signal S_sb is not "return to center steering", the current limiting basic value computing unit 41 computes the current limiting basic value ε of which the value reduces with an increase in the motor speed as described above.

Figure 4:
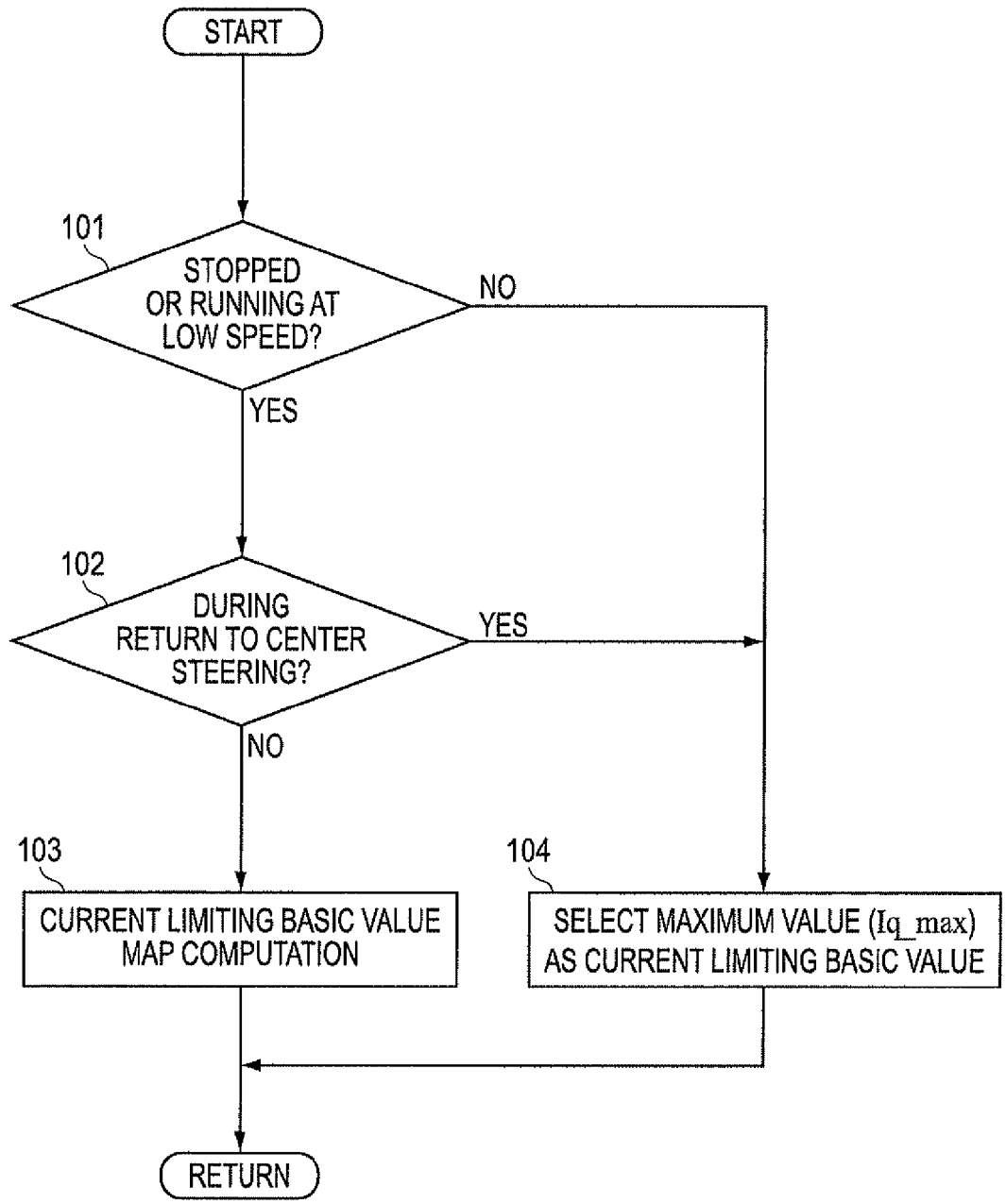
FIG. 4 is a flowchart that shows the procedure of determining whether to execute current limiting basic value map computation.

Specifically, as shown in the flowchart of FIG. 4, the current limiting basic value computing unit 41 first determines on the basis of the running state signal S_mv whether the running state of the vehicle is stopped or running at a low speed or not (step 101), and, when it is determined that the running state is stopped or running at a low speed (YES in step 101), subsequently determines whether the steering state is during "return to center steering" (step 102). Then, when it is determined that the steering state is not during "return to center steering" (NO in step 102), current limiting basic value map computation using the map 41a, that is, computation of the current limiting basic value ε of which the value is reduced with an increase in the motor speed, is executed (step 103).

On the other hand, when it is determined in step 101 that the running state is neither stopped nor running at a low speed (NO in step 101) or when it is determined in step 102 that the steering state is "during return to center steering" (YES in step 102), the above current limiting basic value map computation is not executed (step 104). Then, in such a case, the current limiting basic value computing unit 41 according to the present embodiment outputs a maximum value Iq_max that is preset as a value corresponding to a high limit, at or below which electric conduction is possible, as the current limiting basic value ε.

When running at a vehicle speed higher than or equal to a set speed, a steering feeling is also important; however, it is most important to ensure following capability with which quick steering operation at the time of emergency avoidance is dealt with. Therefore, a configuration is employed in which when the vehicle speed has increased to such a degree that it is determined that the running state is neither stopped nor running at a low speed, an attempt is made to ensure following capability with which emergency avoidance steering is dealt with by relieving the current limiting reference.

In addition, when the steering state is "return to center steering", particularly, in a situation where a large steering angle around a steering end is occurring, the steering may rotate toward a neutral position at a speed higher than or equal to that the driver assumes. In such a case, the driver adds steering force in such a direction that the rotation of the steering is suppressed to adjust the speed at which the steering returns. At this time, if limitations are placed on the q-axis current command value Iq* by giving a priority to suppressing voltage saturation, the rotation of the steering cannot be sufficiently suppressed due to insufficient assist force, so a feeling of strangeness may be experienced by the driver. Then, when the steering state is "return to center steering", the current limiting reference is relieved as described above to thereby avoid occurrence of a situation where assist force required to suppress the rotation of the steering is insufficient. Thus, an attempt is made to improve a steering feeling.

As shown in FIG. 2, the microcomputer 18 is configured to operate on a control voltage (IG) that serves as a second power supply voltage supplied through a control line 47 independent of the electric power line 20 between the in-vehicle power supply 16 and the driving circuit 19. A second voltage sensor 48 that serves as second voltage detecting means is provided at the control line 47, and a control voltage value V_ig detected by the second voltage sensor 48 is input into the microcomputer 18. The current limiting value computing unit 40 uses the control voltage value V_μg in the above described computation of the current limiting value Iq_lim to thereby make it possible to further effectively suppress occurrence of voltage saturation.

More specifically, as shown in FIG. 3, the control voltage value V_ig input into the current limiting value computing unit 40 is input into the subtracter 49 together with the power voltage value V_pig, and, in the subtracter 49, a difference ΔVig between the control voltage value V_ig and the power voltage value V_pig is computed. The current limiting value computing unit 40 is provided with an output gain computing unit 50. The output gain computing unit 50 computes an output gain Kpw on the basis of the difference ΔVig computed by the subtracter 49.

The output gain computing unit 50 computes the output gain Kpw of which the value becomes smaller as the input difference ΔVig increases (Kpw≤1.0). The output gain computing unit 50 computes the output gain Kpw by referring to a map 50a in which a difference ΔVig is associated with an output gain Kpw. The current limiting value computing unit 40 is configured to compute the current limiting value Iq_lim by multiplying the output gain Kpw, computed by the output gain computing unit 50, by the current limiting basic value ϵ together with the voltage gain Kig in the multiplier 43.

At the time when the motor output is increased, voltage saturation easily occurs due to a voltage drop occurring in a wire that constitutes the electric power supply line due to conduction of a large current. Thus, in current limiting for suppressing occurrence of voltage saturation, it is desirable to determine the current limiting value in consideration also of variations in motor output. However, if an electric power output to the motor is computed where necessary, the computation load increases, and a higher-performance information processing device (microcomputer) that constitutes control means is required, which may be a factor to increase cost.

Then, it is noted that, a voltage drop resulting from an increase in output of the motor 12 occurs in the electric power line 20 that constitutes the electric power supply line Lp, whereas such a voltage drop does not occur in the control line 47 independent of the electric power line 20.

By comparing the power voltage value V_pig that drops in voltage with an increase in output of the motor 12 with the control voltage value V_ig having a substantially constant value, it is possible to easily estimate the output state of the motor 12 without leading to an increase in computation load. The output gain computing unit 50 uses the above to compute the output gain Kpw of which the value becomes smaller as the difference ΔVig increases.

The current limiting value computing unit 40 multiplies the output gain Kpw by the current limiting basic value ϵ to reduce the value of the computed current limiting value by a further increase in motor output together with an increase in motor speed and a decrease in power voltage value V_pig. Thus, it is possible to effectively suppress occurrence of voltage saturation even at the time when a motor output is increased, with a simple configuration.

As described above, according to the present embodiment, the following operations and advantageous effects may be obtained.

(1) The current limiting value computing unit 40 computes the current limiting basic value ϵ of which the value becomes lower as the absolute value of the rotation angular velocity ω of the motor 12 increases, and computes the voltage gain Kig of which the value becomes smaller as the power voltage value V_pig, detected by the first voltage sensor 23 provided at the electric power line 20 that constitutes the electric power supply line Lp, decreases. In addition, the current limiting value computing unit 40 computes the difference ΔVig between the control voltage value V_ig, detected by the second voltage sensor 48 provided at the control line 47 independent of the electric power line 20, and the above power voltage value V_pig. Then, the output gain Kpw of which the value becomes smaller as the difference ΔVig increases is computed, and the current limiting value Iq_lim is computed by multiplying the output gain Kpw by the current limiting basic value ϵ together with the voltage gain Kig.

That is, at the time when a motor output is increased, a voltage drop occurs in the electric power line 20 that constitutes the electric power supply line Lp, whereas such a voltage drop does not occur in the control line 47 independent of the electric power line 20. Thus, by comparing the power voltage value V_pig with the control voltage value V_ig, it is possible to easily estimate the output state of the motor 12 without leading to an increase in computation load. Thus, it is possible to determine the current limiting value in consideration also of a decrease in power supply voltage and variations in motor output with a simple configuration, without leading to an increase in computation load. As a result, it is possible to further effectively suppress occurrence of voltage saturation.

(2) The step-up circuit 21 is provided in some midpoint of the electric power line 20, and a voltage (BPIG) stepped up by the step-up circuit 21 is applied to the driving circuit 19. The operation of the step-up circuit 21 is controlled by the step-up control circuit 22 provided in the ECU 11. At the time of a voltage drop of the power voltage value V_pig, the step-up control circuit 22 executes control so as to suppress voltage step up made by the step-up circuit 21, that is, suppress the output voltage (BPIG) to a lower value as the detected power voltage value V_pig decreases.

A voltage applied to the driving circuit 19 decreases through suppressing step-up control and, as a result, voltage saturation easily occurs. Thus, by applying the configuration described in (1) to the configuration described in (2), a further remarkable advantageous effect may be obtained.

Note that the present embodiment may be modified as follows. In the present embodiment, the invention is applied to the electric power steering system (EPS); instead, the invention may be applied to a motor control device used in an application other than the EPS.

In the present embodiment, the configuration in which motor control signals are generated by executing current feedback control is employed; instead, a configuration in which motor control signals are generated by executing open control as the current control may be employed.

In the present embodiment, the step-up circuit 21 is provided in some midpoint of the electric power line 20; instead, a configuration in which no step-up circuit 21 is provided may be employed.

In the present embodiment, the steering state determining unit 44 and the running state determining unit 45 are provided, and, when the running state is neither stopped nor running at a low speed or when the steering state is "during return to center steering", the above current limiting basic value map computation is not executed. However, the invention is not limited to this; and determination as to whether to execute current control basic value map computation may not necessarily be performed. In addition, even when the above determination is performed, it is not always necessary to use the results of determination made by the steering state determining unit 44 and the running state determining unit 45 as the basis. Then, a configuration in which a reduction in current limiting value is suppressed by a method other than non-execution of current control basic value map computation may be employed.

DESCRIPTION OF THE REFERENCE NUMERALS

1 ELECTRIC POWER STEERING SYSTEM (EPS)
2 STEERING WHEEL
10 EPS ACTUATOR
11 ECU
12 MOTOR
16 IN-VEHICLE POWER SUPPLY

18 MICROCOMPUTER
19 DRIVING CIRCUIT
20 ELECTRIC POWER LINE
21 STEP-UP CIRCUIT
22 STEP-UP CONTROL CIRCUIT
23 FIRST VOLTAGE SENSOR
31 MOTOR CONTROL SIGNAL OUTPUT UNIT
32 CURRENT COMMAND VALUE COMPUTING UNIT
33 MOTOR CONTROL SIGNAL GENERATING UNIT
34 CURRENT LIMITING UNIT
40 CURRENT LIMITING VALUE COMPUTING UNIT
41 CURRENT LIMITING BASIC VALUE COMPUTING UNIT
42 VOLTAGE GAIN COMPUTING UNIT
43 MULTIPLIER
44 STEERING STATE DETERMINING UNIT
45 RUNNING STATE DETERMINING UNIT
47 CONTROL LINE
48 SECOND VOLTAGE SENSOR
49 SUBTRACTER
50 OUTPUT GAIN COMPUTING UNIT
Lp ELECTRIC POWER SUPPLY LINE
Iq*, Iq** Q-AXIS CURRENT COMMAND VALUE
Iq_lim CURRENT LIMITING VALUE
Iq_max MAXIMUM VALUE
ε CURRENT LIMITING BASIC VALUE
Kig VOLTAGE GAIN
Kpw OUTPUT GAIN
S_mv RUNNING STATE SIGNAL
S_sb STEERING STATE SIGNAL
ω ROTATION ANGULAR VELOCITY
V_pig POWER VOLTAGE
V_ig CONTROL VOLTAGE
ΔVig DIFFERENCE

The invention claimed is:

1. A motor control device comprising:
a control circuit that has a signal output device that outputs a motor control signal by executing current control;
a driving circuit that is operated upon reception of the motor control signal to supply driving electric power to a motor;
a first voltage detector that detects a first power supply voltage supplied through an electric power line to apply voltage to the driving circuit; and
a second voltage detector that detects a second power supply voltage supplied to the control circuit through a control line independent of the electric power line, wherein
the signal output device limits a current command value computed in the current control to a value at or below a predetermined limiting value, and reduces the limiting value in accordance with an increase in motor speed, and
the signal output device reduces the limiting value in accordance with a decrease in the first power supply voltage, and computes a difference between the second power supply voltage and the first power supply voltage and then reduces the limiting value by a larger amount as the difference increases.

2. The motor control device according to claim 1, further comprising a step-up circuit that steps up and outputs the first power supply voltage, wherein
the driving circuit generates the driving electric power based on the stepped-up voltage, and, at a time when the first power supply voltage is decreased, suppresses voltage step up made by the step-up circuit.

3. The motor control device according to claim 2, wherein the step-up circuit is arranged in a middle portion of the electric power line.

4. An electric power steering system comprising the motor control device according to claim 1.

5. The electric power steering system according to claim 4, further comprising a steering state determining unit that determines a state of steering operation.

6. The electric power steering system according to claim 5, wherein the steering state determining unit has a function of determining whether steering is performed in such a direction that a steering angle is reduced.

* * * * *